US012768991B2

(12) United States Patent
Li et al.

(10) Patent No.: US 12,768,991 B2
(45) Date of Patent: Oct. 20, 2026

(54) LIDAR AND RANGING METHOD USING SAME

(71) Applicant: SiFotonics Technologies (Beijing) Co., Ltd., Beijing (CN)

(72) Inventors: Su Li, Beijing (CN); Fan Qi, Beijing (CN); Pengfei Cai, Beijing (CN); Yongpeng Zhao, Beijing (CN)

(73) Assignee: SiFotonics Technologies (Beijing) Co., Ltd., Beijing (CN)

( * ) Notice: Subject to any disclaimer, the term of this patent is extended or adjusted under 35 U.S.C. 154(b) by 911 days.

(21) Appl. No.: 18/088,812

(22) Filed: Dec. 27, 2022

(65) Prior Publication Data

US 2024/0159904 A1 May 16, 2024

(30) Foreign Application Priority Data

Nov. 3, 2022 (CN) ........................ 202211368183.3

(51) Int. Cl.
*G01S 17/34* (2020.01)
*G01S 7/481* (2006.01)
*G01S 7/4913* (2020.01)
*G01S 7/4915* (2020.01)

(52) U.S. Cl.
CPC ............ *G01S 17/34* (2020.01); *G01S 7/4817* (2013.01); *G01S 7/4913* (2013.01); *G01S 7/4915* (2013.01)

(58) Field of Classification Search
CPC .......... G01S 17/10; G01S 17/34; G01S 17/42; G01S 7/4817; G01S 7/4913; G01S 7/4915; G01S 7/4917
See application file for complete search history.

(56) References Cited

U.S. PATENT DOCUMENTS

2022/0334255 A1* 10/2022 Shin ...................... G01S 7/4818
2024/0004072 A1* 1/2024 Terada .................. G01S 7/4911

OTHER PUBLICATIONS

Santosh Kumar et al., 1 x 8 signal Router using cascading the Mach-Zehnder Interferometers, 2013 6th IEEE/International Conference on Advanced Infocomm Technology, Oct. 7, 2013.

* cited by examiner

*Primary Examiner* — Hina F Ayub

(57) ABSTRACT

The present invention discloses a light detection and ranging (LIDAR) system ranging method, including: circularly allocating, by a light routing device, each periodic signal of a transmit signal to each light channel in a chronological order, monitoring a beat signal or a returned light pulse signal in each light channel, and calculating a target distance according to a frequency of the beat signal or a return delay time of the light pulse signal. The present invention further discloses a LIDAR, including: a laser source, a light routing device, an optical scanning system, a light detector, and a data processing module. A quantity of detection points per second of each beam is increased to N times, where N is a quantity of channels of the light routing device, so as to improve the detection efficiency and reduce the requirement on transmit resources; and a scanning mode and an angular resolution can be dynamically controlled according to needs.

4 Claims, 9 Drawing Sheets

LIDAR AND RANGING METHOD USING SAME

TECHNICAL FIELD

The present invention relates to the technical field of light detection and ranging (LIDAR) systems and a ranging method using the LIDAR.

BACKGROUND

Frequency modulated continuous wave (FMCW) and time of flight (TOF) LIDAR systems calculate a distance between a local end and each target within a field of view based on a frequency difference or a time delay between a reflected signal by the target and a transmit signal.

A LIDAR generally guides, by using a scanning system, transmit light to scan a field of view to form a 3D point cloud. A scanning beam may be one channel having a pair of a laser beam and a light detector, or a plurality of channels having a plurality of pairs of laser beams and light detectors. For a one-channel LIDAR, after a transmit signal is sent to each target point, the system needs to wait for a period of time (dwelling time), which needs to be long enough to receive a reflected signal from a farthest target point within a detection range, before sending the transmit signal to a next adjacent point, so as to avoid crosstalk between adjacent points. However, for a LIDAR having a relatively large detection range, for example, a LIDAR having a maximum detection range of 200 meters or 500 meters, a minimum dwelling time required for each point may reach 1.33 microseconds or 3.33 microseconds, and as a result, a quantity of detection points per second of each beam is limited to only 750000 or 300300, which ultimately affects the measurement efficiency.

A feasible solution to the problem of long dwelling time is to configure a plurality of light detectors for each laser beam channel, and distinguish reflected signals from different adjacent target points by using different light detectors. However, the solution has the following technical problems:

First, each channel needs a large quantity of light detectors, which leads to a high overall system cost.

Second, for an FMCW LIDAR, the distance to each target point is to be calculated according to a beat frequency of a reflected signal and a local oscillator signal at a local end. To accurately calculate distances to all target points within the detection range, a frequency of an output signal from a transmit end/local oscillator needs to continuously increase/decrease within a maximum round-trip time. The periodic change form of continuous increasing/decreasing of the frequency (chirp period) may continuously span a plurality of detection points, and therefore, an amplitude (chirp bandwidth) by which the frequency increases/decreases in each point needs to be large enough to guarantee an acceptable ranging resolution and ranging precision. In this case, the LIDAR needs to have a high bandwidth chirp generation capacity and a high sampling rate; in other words, there is a high requirement on the performance.

SUMMARY

To solve the foregoing technical problems, the present invention provides a LIDAR and a ranging method using the LIDAR. To have a basic understanding of some aspects of embodiments of the present disclosure, a simple summary is given below. The summary is not a general comment, nor is intended to identify key/important elements or describe the scope of protection of these embodiments. The only purpose is to present some concepts in a simple form, to serve as a preface to the detailed description below.

The present invention adopts the following technical solution:

In a first aspect, the present invention provides a LIDAR ranging method, including: circularly allocating, by a light routing device, each periodic signal of a transmit signal to each light channel in a chronological order, monitoring a beat signal or a returned light pulse signal in each light channel, and calculating a target distance according to a frequency of the beat signal or a return delay time of the light pulse signal.

Further, the light routing device circularly allocates at least one periodic signal of the transmit signal to each light channel in a chronological order before a reflected signal from a farthest target object within a maximum-ranging range is received in any light channel.

In an embodiment, a frequency of the transmit signal changes with time; part of the transmit signal is partitioned as a local oscillator signal, and the local oscillator signal is combined with the reflected signal in each light channel to form the beat signal.

Further, a process of calculating the target distance according to the frequency of the beat signal includes:

calculating a delay time $t_n$ of the beat signal $f_{IF}n$ detected at an $n^{th}$ chirp period relative to a start point of the $n^{th}$ chirp period through $$t_n = \frac{T \times f_{IF}n}{B},$$

where T is a chirp period duration and B is a bandwidth;

calculating a total delay time $\Delta t$ of the beat signal $f_{IF}n$ detected at the $n^{th}$ chirp period relative to a start point of the transmit signal through $\Delta t = T_1 + T_2 + \ldots + T_{n-1} + t_n$, where $T_n$ is an $n^{th}$ chirp period duration; and calculating the target distance through $$R = \frac{c \times \Delta t}{2},$$

where c is a speed of light.

In an embodiment, the transmit signal is a light pulse signal, and the transmit signal in each light channel is reflected by a target object, returned to each light channel, and detected by a light detector in each light channel; and a process of calculating the target distance according to the return delay time of the light pulse signal includes: recording a return delay time $\Delta t$ of the optical pulse signal; and calculating the target distance through $$R = \frac{c \times \Delta t}{2},$$

where c is a speed of light.

In a second aspect, the present invention further provides a LIDAR, including: a light routing device, configured to circularly allocate each periodic signal of a transmit signal to each light channel in a chronological order, where a frequency of the transmit signal changes with time or the transmit signal is a light pulse signal;

a light detector, configured to monitor a beat signal or a returned light pulse signal in each light channel; and a data processing module, configured to calculate a target distance according to a monitored frequency of the beat signal or return delay time of the light pulse signal.

Further, the light routing device is further configured to circularly allocate at least one periodic signal of the transmit signal to each light channel in a chronological order before a reflected signal from a farthest target object within a maximum-ranging range is received in any light channel.

In an embodiment, the LIDAR further includes: a beam splitter, configured to partition part of the transmit signal as a local oscillator signal; and a combiner, configured to combine the local oscillator signal partitioned by the beam splitter with the reflected signal in the light channel to form the beat signal and output the beat signal, where the reflected signal in the light channel is guided to the light detector by a circulator, or the reflected signal from each light channel within a corresponding field of view is received to a corresponding receive light channel by an optical receive system.

In an embodiment, the reflected signal in the light channel is guided to the light detector by a circulator, or the reflected signal from each light channel within a corresponding field of view is received to a corresponding receive light channel by an optical receive system.

Further, the LIDAR further includes: a laser source, configured to generate the transmit signal; and an optical scanning system, configured to guide the transmit signal from each light channel to a target object within a field of view.

The beneficial effects of the present invention:

1. A quantity of detection points per second of each beam can be increased to N times (N is a quantity of channels of the light routing device), so as to improve the detection efficiency and reduce the requirement on transmit resources.
2. Each light channel only needs to be equipped with one light detector provided the crosstalk influence between the light channels is acceptable, so as to avoid significant increase in the costs.
3. A scanning mode and angular resolution can be dynamically controlled according to needs. For example, when a region of interest is identified, the light routing device may allocate signals in all light channels to the region of interest, so as to increase the angular resolution of the region of interest, having the advantages of investing detection resources according to needs, and improving the detection precision of a key region of interest without increasing the system processing capacity and costs.

BRIEF OF THE DRAWINGS

To explain the technical solutions in the embodiments of the present invention more clearly, the following will briefly describe the accompanying drawings that need to be used in the description of the embodiments. Obviously, the accompanying drawings in the following description show only some embodiments of the present invention, and a person of ordinary skill in the art can still derive others drawings from these drawings without creative efforts.

DETAILED DESCRIPTION OF THE EMBODIMENTS

The following describes the embodiments of the present invention in detail below in combination with the drawings. It should be clarified that the described embodiments are only a part of, other than all of, the embodiments of the present invention. Based on the embodiments of the present invention, all other embodiments obtained by a person of ordinary skill in the art without creative efforts shall fall within the scope of protection of the present invention.

In an embodiment, the present invention provides an FMCW LIDAR ranging method, including the following steps:

S1: A light routing device circularly allocates each periodic signal of a transmit signal to each light channel in a chronological order.

Figure 2:
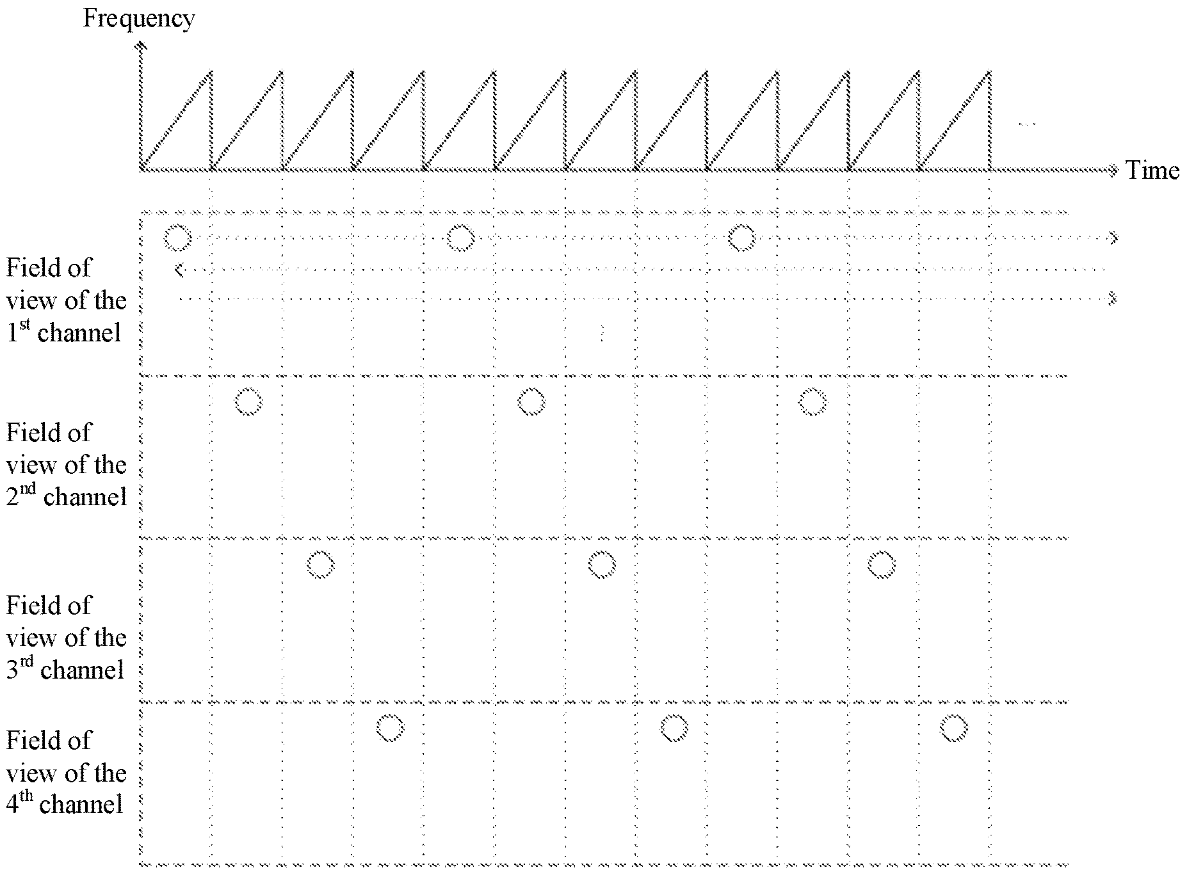
FIG. 2 is a schematic diagram of arrangement of an FMCW sawtooth chirp signal and scanning points of the present invention.

A frequency of the transmit signal changes with time. Specifically, the frequency of the transmit signal changes in a form of periodic, continuous increasing/decreasing. In this embodiment, for example, a description is provided by using a periodic sawtooth chirp signal as the transmit signal. As shown in FIG. 2, the frequency of the transmit signal increases linearly with time and increases periodically. The transmit signal may be divided into periodic signals according to a period. Each periodic signal is a period of the transmit signal, and the periodic signals are arranged chronologically. The light routing device circularly allocates each periodic signal to each light channel in a chronological order. Cyclic allocation refers to guiding each periodic signal to each light channel in an arrangement order of the light channels, and the cyclic allocation does not limit that each light channel needs to be allocated with a periodic signal, nor limit the quantity of periodic signals to be allocated to each light channel or a direction of allocation. Therefore, the periodic signals can be selectively allocated to each channel according to actual needs.

Specifically, the light routing device circularly allocates at least one periodic signal of the transmit signal to each light channel in a chronological order before a reflected signal from a farthest target object within a maximum-ranging range is received in any light channel, so that the system does not need to wait for a previous signal to return before sending a next signal; in other words, the waiting time is omitted. In addition, in the present invention, the periodic signal is allocated to each light channel in a chronological order, so that the crosstalk influence between adjacent points can be reduced and insufficient detection points due to long dwelling time can be avoided.

Figure 3:
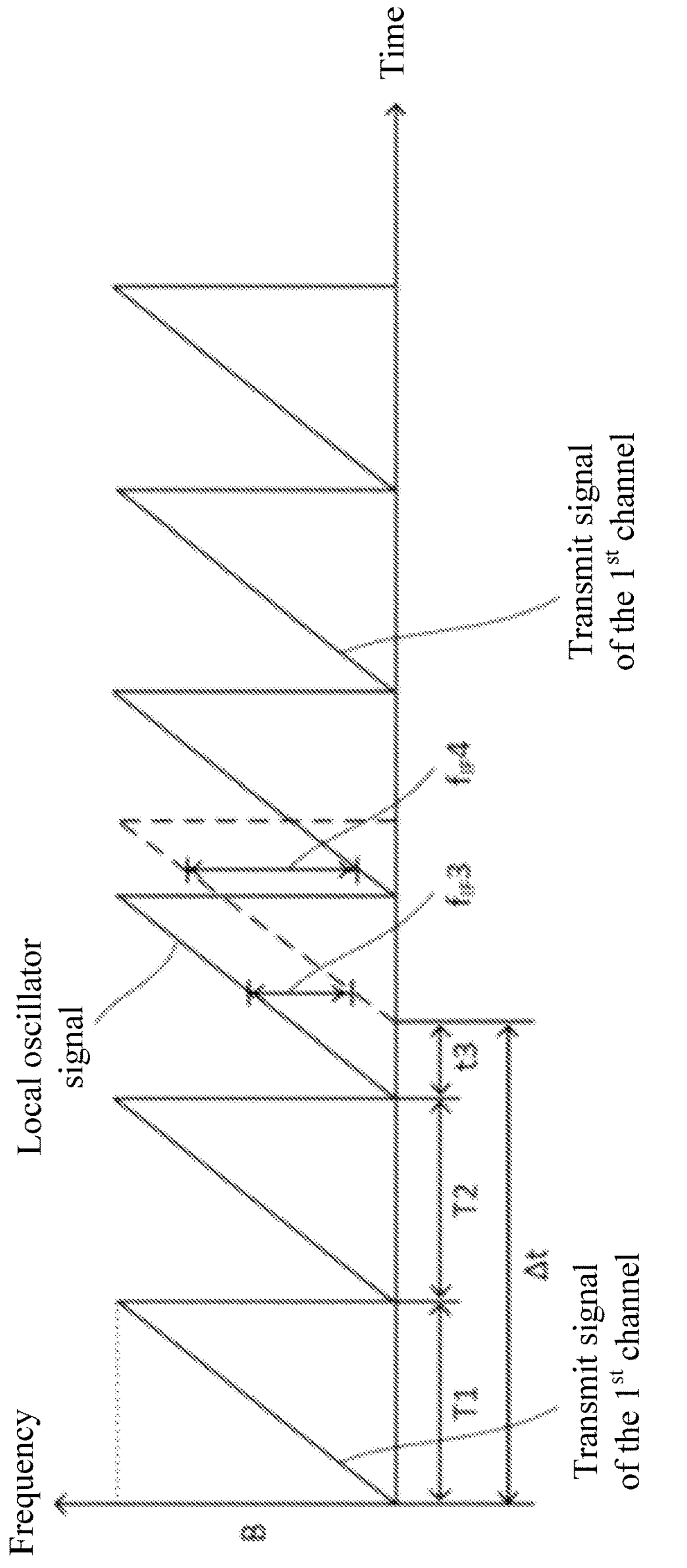
FIG. 3 is a schematic diagram of FMCW transmit signal and reflected signal of the present invention.

As shown in FIG. 3, the system receives a reflected signal during a third chirp period after a transmit signal of a $1^{st}$ channel, and before the operation, the light routing device has allocated a periodic signal of a second chirp period to a $2^{nd}$ channel and allocated a periodic signal of a third chirp period to a $3^{rd}$ channel. FIG. 3 is just an example of one case, and in the present invention, if necessary, more periodic signals of the transmit signal may be selectively allocated to different light channels before receiving a first reflected signal.

S2: An optical scanning system guides the transmit signal from each light channel to a target object within a field of view, and the transmit signal is reflected by the target object to form a reflected signal, which is then returned to each light channel.

As shown in FIG. 2, in this embodiment, for example, a description is provided by using four light channels. The optical scanning system scans transmit signals of four light channels at four different fields of view, and the four fields of view together form an entire field of view of the LIDAR system. Fields of views of a plurality of light channels may be arranged in various ways, for example, vertical alignment, horizontal alignment, or in a two-dimensional matrix, overlapping or not overlapping each other.

S3: A circulator in each light channel transmits the reflected signal to a combiner, or an optical receive system transmits the reflected signal to the combiner, and the combiner combines a local oscillator signal with the reflected signal in each light channel to form a beat signal. Before the operation, a beam splitter partitions part of the transmit signal from a light source as a local oscillator signal, namely, an LO signal.

Figure 4:
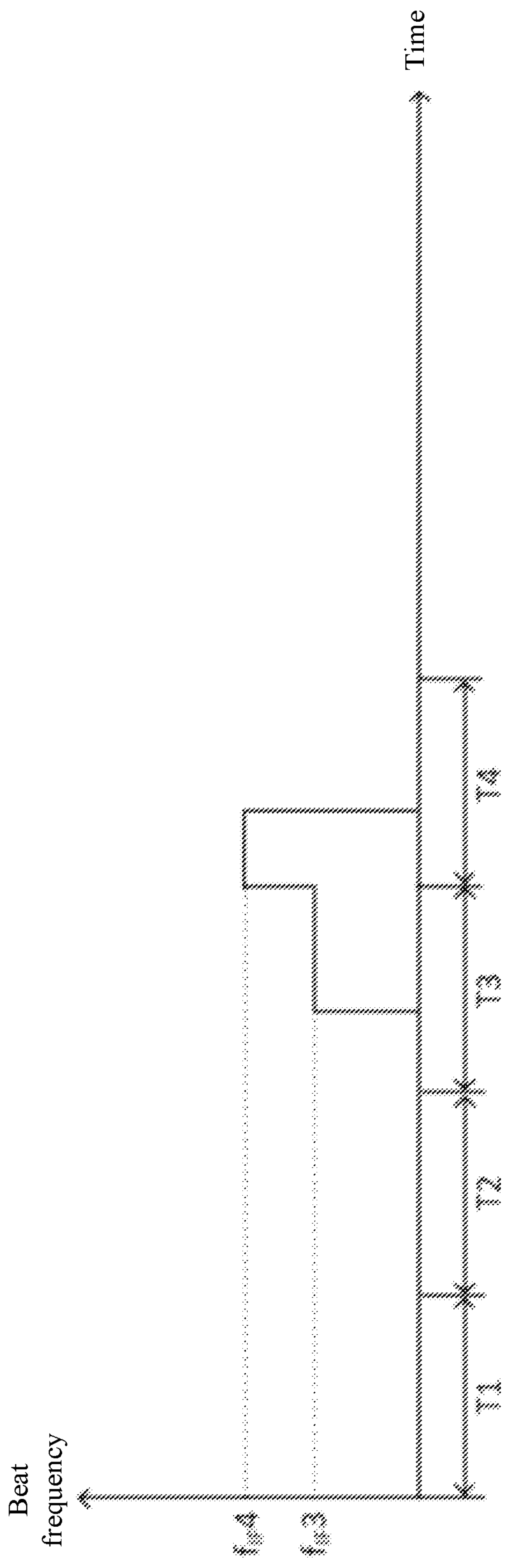
FIG. 4 is a schematic diagram of an FMCW beat signal of the present invention.

As shown in FIG. 3 and FIG. 4, in an example, the system receives the reflected signal during the third chirp period after the transmit signal of the $1^{st}$ channel (the reflected signal is represented by a dotted line in FIG. 3), and the reflected signal is distributed between the third chirp period and a fourth chirp period. The reflected signal and the LO signal are mixed in the combiner to generate a beat signal. For example, a first beat signal $f_{IF}3$ is obtained by using the beat signal of the LO signal and the reflected signal during the third chirp period, and a second beat signal $f_{IF}4$ is obtained by using the beat signal of the LO signal and the reflected signal during the fourth chirp period.

S4: A light detector monitors a beat signal in each light channel Reflected signals from different light channels are detected by different light detectors to further avoid cross-talk between returned signals of adjacent transmit signals, and each light channel only needs to be equipped with one light detector, so as to avoid a significant increase in the costs.

Further, the beat signal in each chirp period is monitored by a transimpedance amplifier, an analog-to-digital converter, and a signal processing unit, and a frequency value of the beat signal is obtained by using a Fast Fourier Transform (FFT) algorithm.

S5: Calculate a target distance according to the frequency of the beat signal. Specifically, the target distance is calculated according to the frequency value of the beat signal. The following describes a calculation process of the target distance by using a periodic sawtooth chirp signal as the transmit signal:

First, a delay time $t_n$ of the beat signal $f_{IF}n$ detected at an $n^{th}$ chirp period relative to a start point of the $n^{th}$ chirp period is calculated through $$t_n = \frac{T \times f_{IF}n}{B},$$

where T is a chirp period duration and B is a bandwidth. As shown in FIG. 3 and FIG. 4, in an example, the system receives a reflected signal during the third chirp period after the transmit signal of the $1^{st}$ channel, and in this case, the delay time $t_3$ of the beat signal $f_{IF}3$ relative to a start point of the third chirp period can be obtained through $$t_3 = \frac{T \times f_{IF}^3}{B}.$$

It should be noted that $f_{IF}3$ can be calculated by using the beat frequency of the third chirp or the fourth chirp of the LO signal and the reflected signal ($f_{IF}3=B-f_{IF}4$), or obtained by combining two beat signals.

Then, a total delay time $\Delta t$ of the beat signal $f_{IF}n$ detected at the $n^{th}$ chirp period relative to the start point of the transmit signal is calculated through $\Delta t=T_1+T_2+ \ldots +T_{n-1}+t_n$, where $T_n$ is an $n^{th}$ chirp period duration. As shown in FIG. 3 and FIG. 4, in an example, the chirp period duration remains constant, that is, $T_1=T_2=T_3-T_4=T$ is satisfied. Specifically, the total delay time $\Delta t$ of the beat signal $f_{IF}3$ detected in the third chirp period with respect to the start point of the transmit signal is obtained through $\Delta t=T_1+T_2+t_3$. A time of the start point of the transmit signal is defined as a zero point.

Finally, the target distance is calculated through $$R = \frac{c \times \Delta t}{2},$$

where C is a speed of light.

Generally, when there is a relative speed between the target object and the LIDAR, the reflected signal may shift due to the Doppler effect. A Doppler frequency shift and a speed of the target object can be obtained together with other detection signals. For simplicity, in the examples shown herein, it is assumed that the Doppler effect or the relative speed between the target object and the LIDAR can be ignored.

Figure 1:
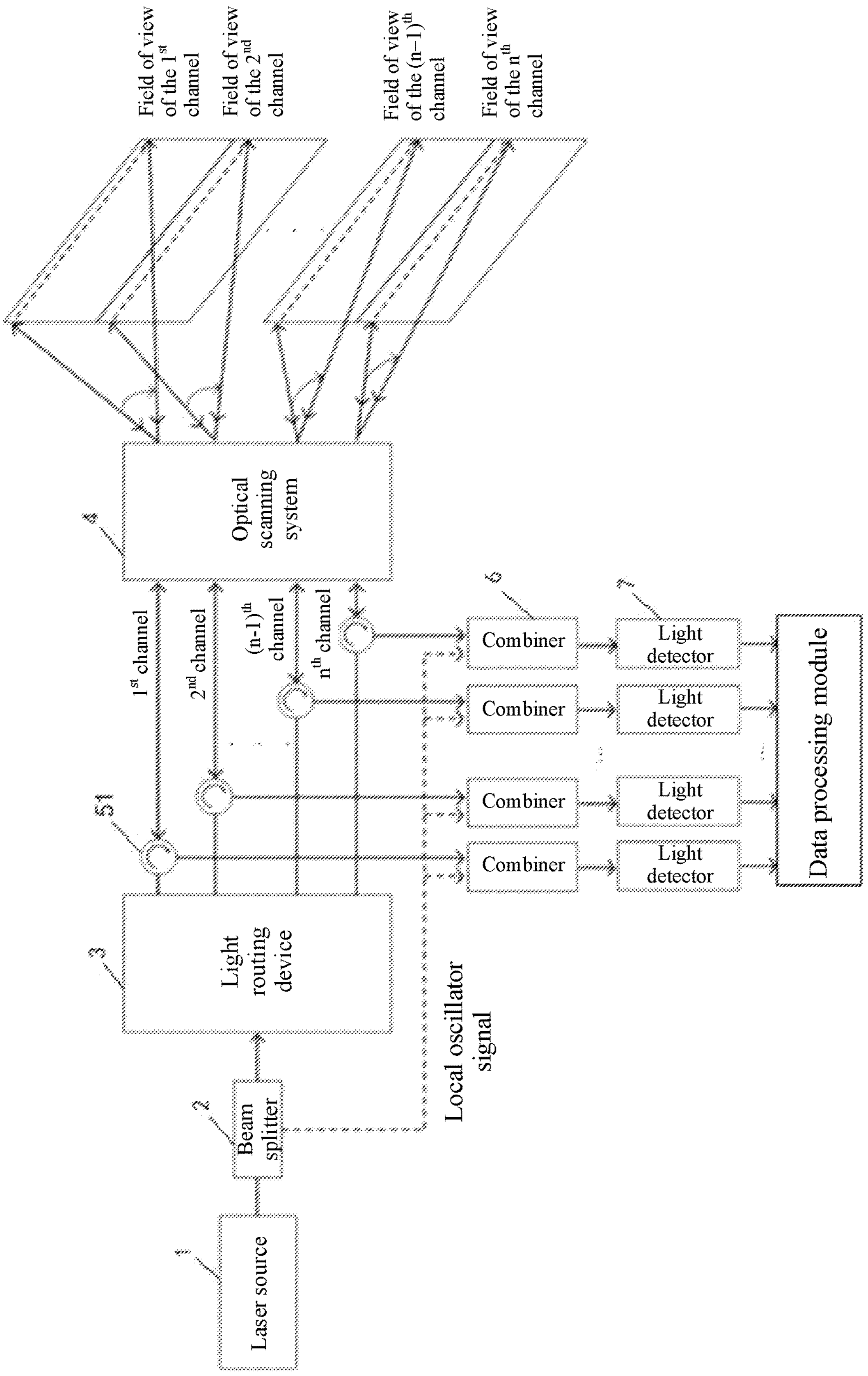
FIG. 1 is a schematic structural diagram of a coaxial FMCW LIDAR of the present invention.
Figure 7:
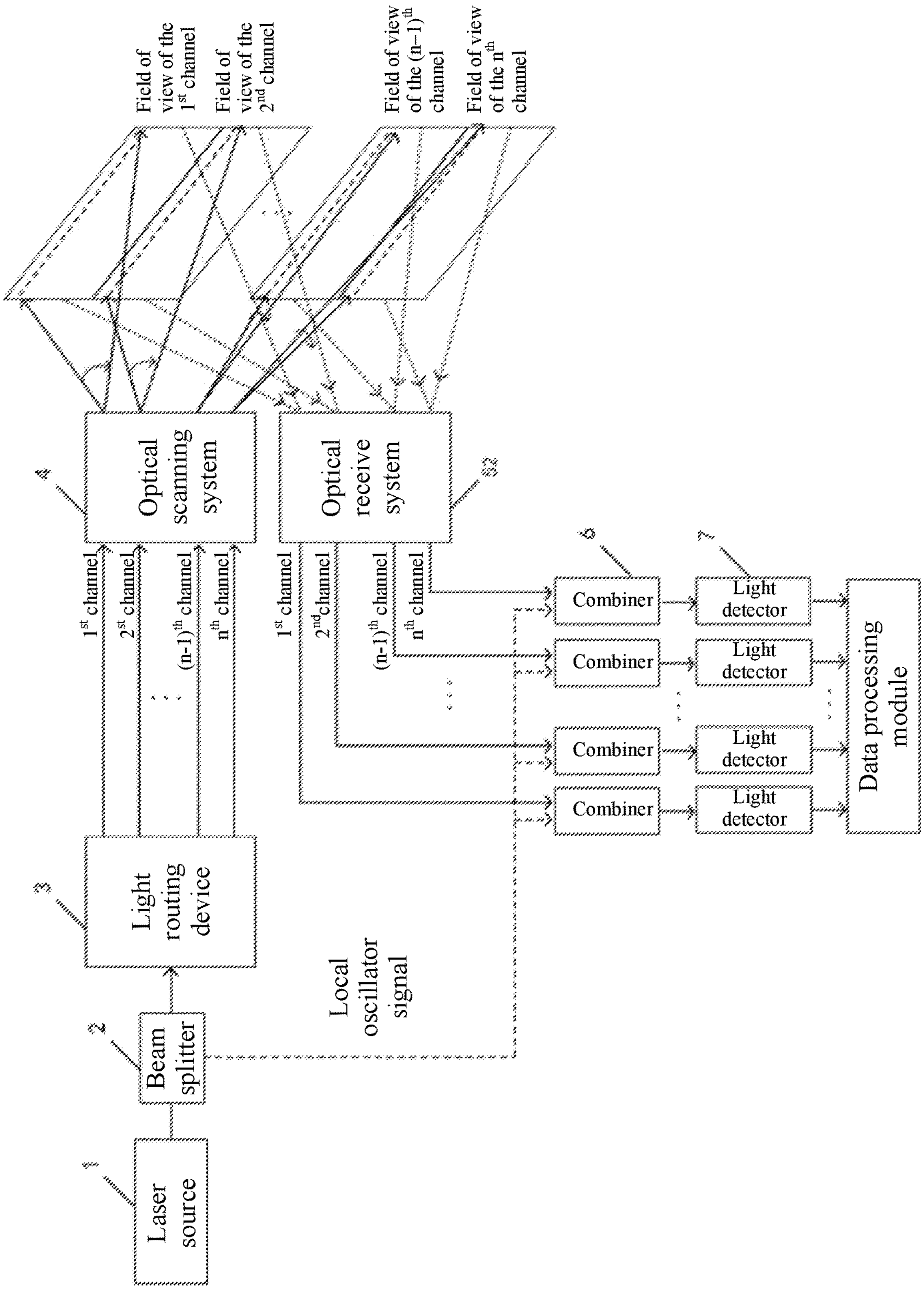
FIG. 7 is a schematic structural diagram of a non-coaxial FMCW LIDAR of the present invention.

In an embodiment, as shown in FIG. 1 and FIG. 7, the present invention further provides an FMCW LIDAR, including: a laser source 1, a beam splitter 2, a light routing device 3, an optical scanning system 4, a combiner 6, a light detector 7, and a data processing module.

FIG. 1 is a schematic structural diagram of a coaxial FMCW LIDAR. FIG. 7 is a schematic structural diagram of a non-coaxial FMCW LIDAR.

The laser source 1 is configured to generate a transmit signal. A frequency of the transmit signal changes with time. Specifically, the frequency of the transmit signal changes in a form of periodic, continuous increasing/decreasing. In this embodiment, for example, a description is provided by using a periodic sawtooth chirp signal as the transmit signal, as shown in FIG. 2.

The beam splitter 2 is configured to partition part of a transmit signal as a local oscillator signal, namely, an LO signal.

The light routing device 3 is configured to circularly allocate each periodic signal of a transmit signal to each light channel in a chronological order. As shown in FIG. 2, a frequency of the transmit signal increases linearly with time and increases periodically. The transmit signal may be divided into periodic signals according to a period. Each periodic signal is a period of the transmit signal, and the periodic signals are arranged chronologically. The light routing device 3 circularly allocates each periodic signal to each light channel in a chronological order. Cyclic allocation refers to guiding each periodic signal to each light channel in an arrangement order of the light channels, and the cyclic allocation does not limit that each light channel needs to be allocated with a periodic signal, nor limit the quantity of periodic signals to be allocated to each light channel or a direction of allocation. Therefore, the periodic signals can be selectively allocated to each channel according to actual needs.

Specifically, the light routing device 3 circularly allocates at least one periodic signal of the transmit signal to each light channel in a chronological order before a reflected signal from a farthest target object within a maximum-ranging range is received in any light channel, so that the system does not need to wait for a previous signal to return before sending a next signal; in other words, the waiting time is omitted. In addition, in the present invention, the periodic signal is allocated to each light channel in a chronological order, so that the crosstalk influence between adjacent points can be reduced and insufficient detection points due to long dwelling time can be avoided.

As shown in FIG. 3, the system receives a reflected signal during a third chirp period after a transmit signal of a 1$^{st}$ channel, and before the operation, the light routing device 3 has allocated a periodic signal of a second chirp period to a 2$^{nd}$ channel and allocated a periodic signal of a third chirp period to a 3$^{rd}$ channel. FIG. 3 is just an example of one case, and in the present invention, if necessary, more periodic signals of the transmit signal may be selectively allocated to different light channels before receiving a first reflected signal.

The optical scanning system 4 is configured to guide the transmit signal from each light channel to a target object within a field of view. The transmit signal is reflected by the target object to form a reflected signal, which is then returned to each light channel. As shown in FIG. 2, in this embodiment, for example, a description is provided by using four light channels. The optical scanning system 4 scans transmit signals of four light channels at four different fields of view, and the four fields of view together form an entire field of view of the LIDAR system. Fields of view of a plurality of light channels may be arranged in various ways, for example, vertical alignment, horizontal alignment, or in a two-dimensional matrix, overlapping or not overlapping each other.

In this embodiment, as shown in FIG. 1, the reflected signal in the light channel is guided to the combiner 6 by a circulator 51, or as shown in FIG. 7, the reflected signal from each light channel within a corresponding field of view is received to a corresponding receive light channel by an optical receive system 52.

The combiner 6 is configured to combine the local oscillator signal partitioned by the beam splitter 2 with the reflected signal in the light channel to form beat signal and output the beat signal. As shown in FIG. 3 and FIG. 4, in an example, the system receives the reflected signal during the third chirp period after the transmit signal of the 1$^{st}$ channel (the reflected signal is represented by a dotted line in FIG. 3), and the reflected signal is distributed between the third chirp period and a fourth chirp period. The reflected signal and the LO signal are mixed in the combiner to generate a beat signal. For example, a first beat signal $f_{IF}3$ is obtained by using the beat signal of the LO signal and the reflected signal during the third chirp period, and a second beat signal $f_{IF}4$ is obtained by using the beat signal of the LO signal and the reflected signal during the fourth chirp period.

The light detector 7 is configured to monitor a beat signal in each light channel. Reflected signals from different light channels are detected by different light detectors to further avoid crosstalk between returned signals of adjacent transmit signals, and each light channel only needs to be equipped with one light detector, so as to avoid a significant increase in the costs.

Further, the beat signal in each chirp period is monitored by a transimpedance amplifier, an analog-to-digital converter, and a signal processing unit, and a frequency value of the beat signal is obtained by using a Fast Fourier Transform (FFT) algorithm.

The data processing module is configured to calculate a target distance according to the monitored beat signal, specifically, calculate the target distance according to a frequency value of the beat signal. A calculation process refers to S5 in the FMCW LIDAR ranging method mentioned in the present invention.

Figure 6:
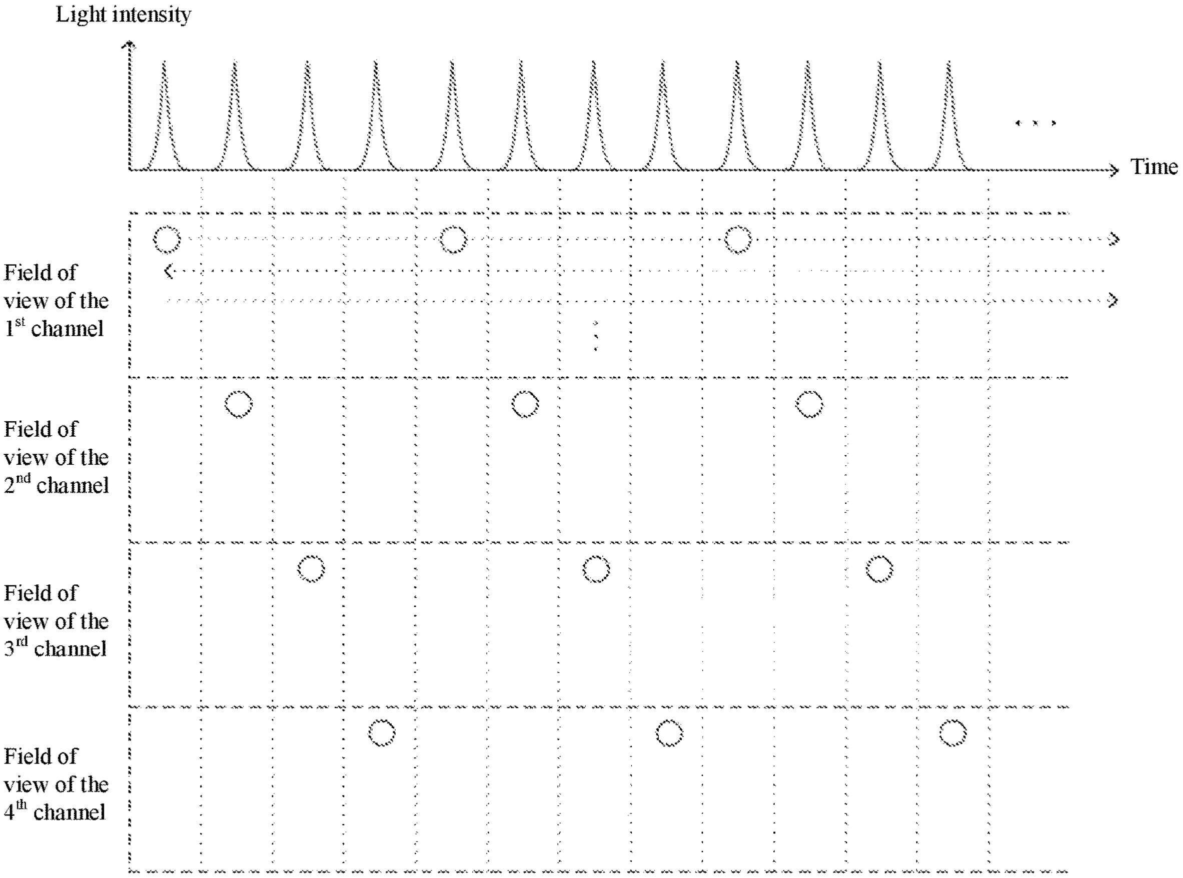
FIG. 6 is a schematic diagram of arrangement of a TOF pulse signal and scanning points of the present invention.

In an embodiment, the present invention provides a TOF LIDAR ranging method, including the following steps:

S1: A light routing device circularly allocates each periodic signal of a transmit signal to each light channel in a chronological order. As shown in FIG. 6, the transmit signal is a periodic pulse signal, and in this case, the light routing device circularly allocates each pulse signal of the transmit signal to each light channel in a chronological order. Cyclic allocation refers to guiding each pulse signal to each light channel in an arrangement order of the light channels, and the cyclic allocation does not limit that each light channel needs to be allocated with a pulse signal, nor limit the quantity of pulse signals to be allocated to each light channel or a direction of allocation. Therefore, the pulse signals can be selectively allocated to each channel according to actual needs.

Specifically, the light routing device circularly allocates at least one pulse signal of the transmit signal to each light channel in a chronological order before a reflected signal from a farthest target object within a maximum-ranging range is received in any light channel, so that the system does not need to wait for a previous signal to return before sending a next signal; in other words, the waiting time is omitted. In addition, in the present invention, the pulse signal is allocated to each light channel in a chronological order, so that the crosstalk influence between adjacent points can be reduced and insufficient detection points due to long dwelling time can be avoided.

S2: An optical scanning system guides the transmit signal from each light channel to a target object within a field of view, and the transmit signal is reflected by the target object to form a reflected signal, which is then returned to each light channel.

As shown in FIG. 6, in this embodiment, for example, a description is provided by using four light channels. The optical scanning system scans transmit signals of four light channels at four different fields of view, and the four fields of view together form an entire field of view of the LIDAR system. Fields of view of a plurality of light channels may be arranged in various ways, for example, vertical alignment, horizontal alignment, or in a two-dimensional matrix, overlapping or not overlapping each other.

S3: A circulator in each light channel transmits the reflected signal to a light detector, or an optical receive system transmits the reflected signal to a light detector.

S4: The light detector monitors the reflected signal in each light channel Reflected signals from different light channels are detected by different light detectors to further avoid crosstalk between returned signals of adjacent transmit signals, and each light channel only needs to be equipped with one light detector, so as to avoid a significant increase in the costs.

S5: Calculate a target distance according to a return delay time of the light pulse signal.

The transmit signal is a light pulse signal, and the transmit signal in each light channel is reflected by a target object, returned to each light channel, and detected by a light detector in each light channel; and a process of calculating the target distance according to the return delay time of the light pulse signal includes:

recording a return delay time Δt of the light pulse signal; and calculating the target distance through $$R = \frac{c \times \Delta t}{2},$$

where c is a speed of light.

Figure 5:
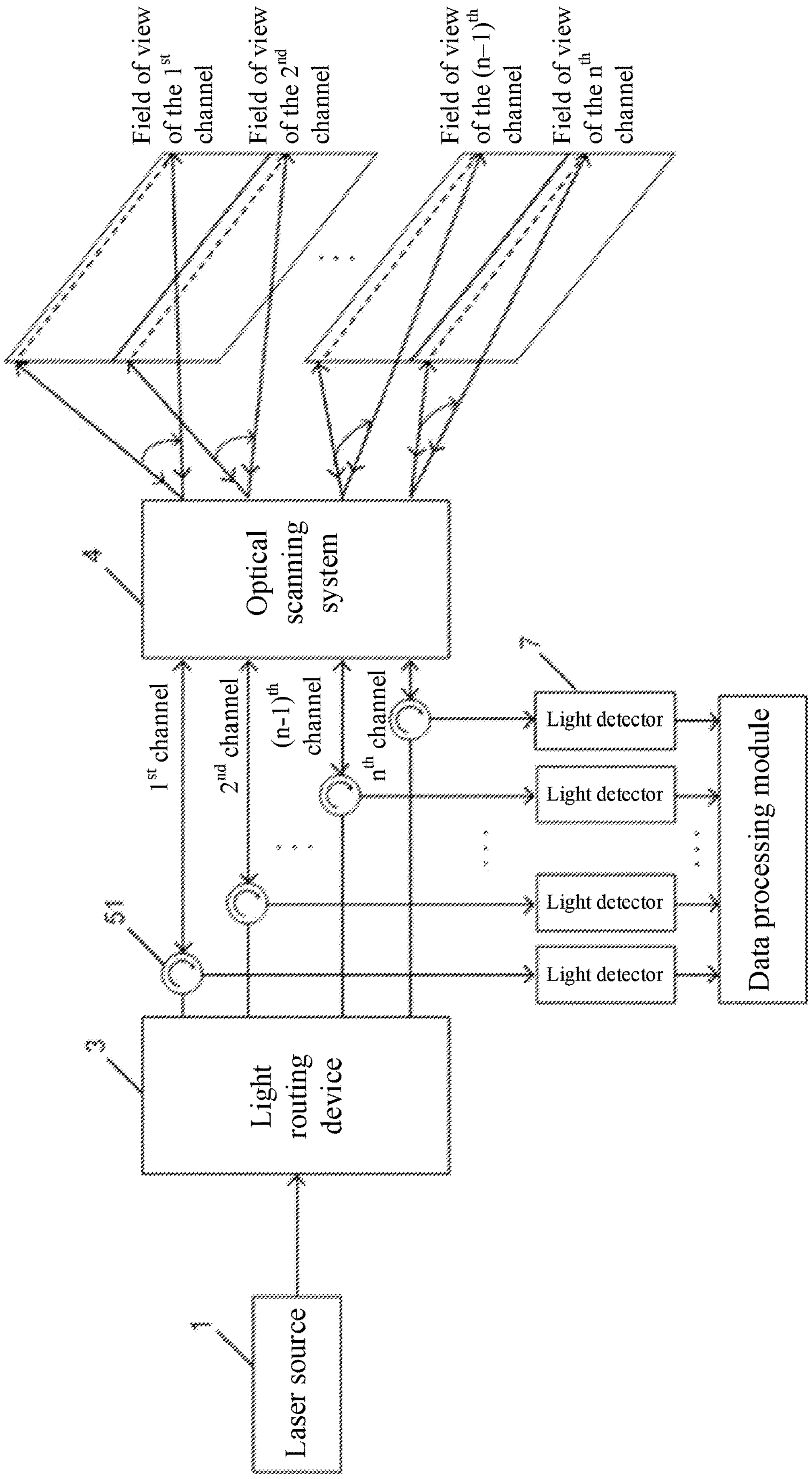
FIG. 5 is a schematic structural diagram of a coaxial TOF LIDAR of the present invention.
Figure 8:
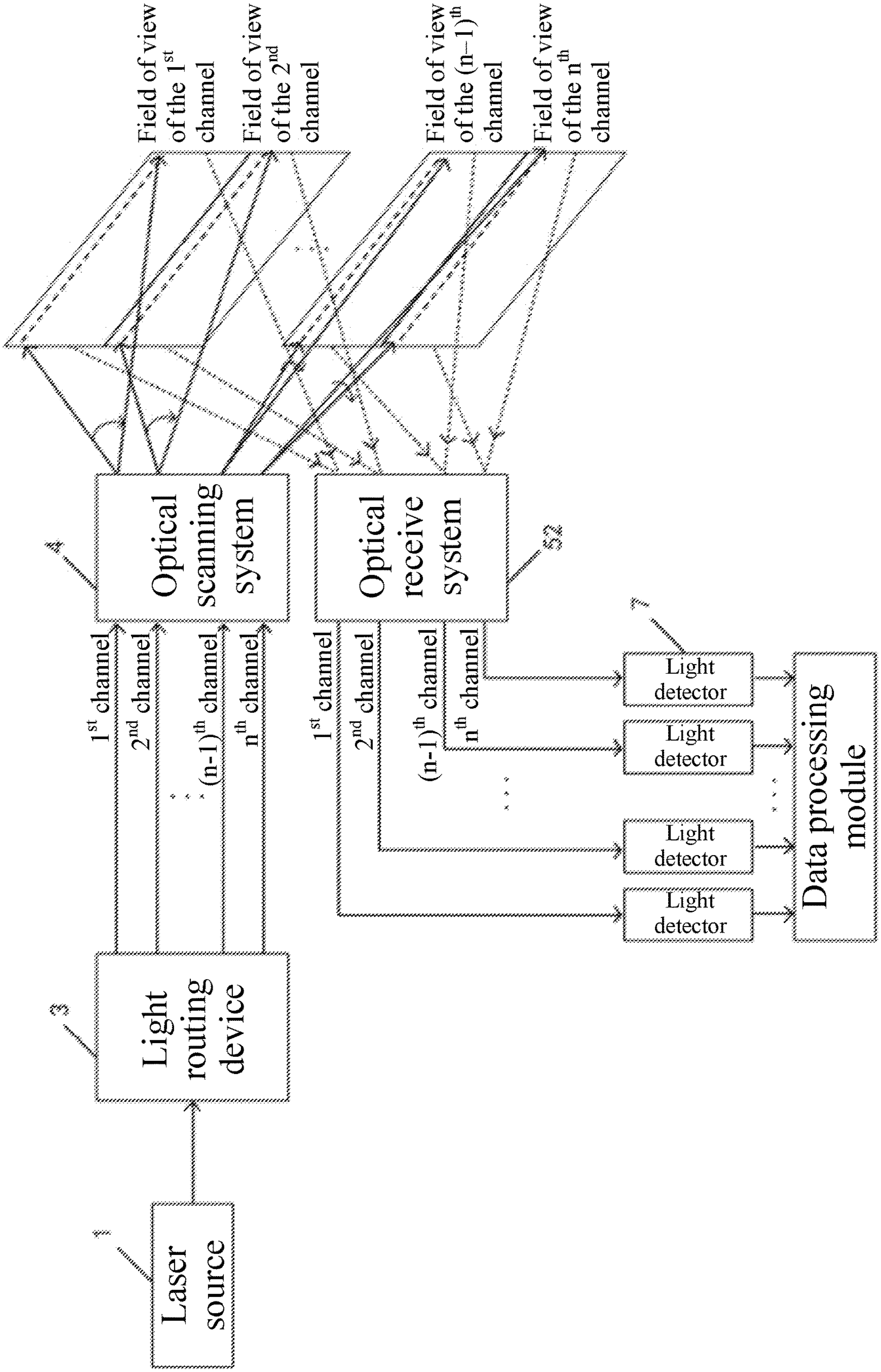
FIG. 8 is a schematic structural diagram of a non-coaxial TOF LIDAR of the present invention.

In an embodiment, as shown in FIG. 5 and FIG. 8, the present invention further provides a TOF LIDAR, including: a laser source 1, a light routing device 3, an optical scanning system 4, a light detector 7, and a data processing module.

FIG. 5 is a schematic structural diagram of a coaxial TOF LIDAR. FIG. 8 is a schematic structural diagram of a non-coaxial TOF LIDAR.

The laser source 1 is configured to generate a transmit signal, specifically configured to generate a periodic light pulse signal.

The light routing device 3 is configured to circularly allocate each pulse signal, that is, periodic signal, of a transmit signal to each light channel in a chronological order. As shown in FIG. 6, the transmit signal is a periodic light pulse signal, and in this case, the light routing device 3 circularly allocates each pulse signal of the transmit signal to each light channel in a chronological order. Cyclic allocation refers to guiding each pulse signal to each light channel in an arrangement order of the light channels, and the cyclic allocation does not limit that each light channel needs to be allocated with a pulse signal, nor limit the quantity of pulse signals to be allocated to each light channel or a direction of allocation. Therefore, the pulse signals can be selectively allocated to each channel according to actual needs.

Specifically, the light routing device 3 circularly allocates at least one pulse signal of the transmit signal to each light channel in a chronological order before a reflected signal from a farthest target object within a maximum-ranging range is received in any light channel, so that the system does not need to wait for a previous signal to return before sending a next signal; in other words, the waiting time is omitted. In addition, in the present invention, the pulse signal is allocated to each light channel in a chronological order, so that the crosstalk influence between adjacent points can be reduced and insufficient detection points due to long dwelling time can be avoided.

The optical scanning system 4 is configured to guide the transmit signal from each light channel to a target object within a field of view. The transmit signal is reflected by the target object to form a reflected signal, which is then returned to each light channel. As shown in FIG. 6, in this embodiment, for example, a description is provided by using four light channels. The optical scanning system 4 scans transmit signals of four light channels at four different fields of view, and the four fields of view together form an entire field of view of the LIDAR system. Fields of view of a plurality of light channels may be arranged in various ways, for example, vertical alignment, horizontal alignment, or in a two-dimensional matrix, overlapping or not overlapping each other.

In this embodiment, as shown in FIG. 5, the reflected signal in the light channel is guided to the light detector 7 by a circulator 51, or as shown in FIG. 8, the reflected signal from each light channel within a corresponding field of view is received to a corresponding receive light channel by an optical receive system 52.

The light detector 7 is configured to monitor a pulse signal in each light channel. Reflected signals from different light channels are detected by different light detectors to further avoid crosstalk between returned signals of adjacent transmit signals, and each light channel only needs to be equipped with one light detector, so as to avoid a significant increase in the costs.

The data processing module is configured to calculate a target distance according to the return delay time of the light pulse signal. The transmit signal is a light pulse signal, and the transmit signal in each light channel is reflected by a target object, returned to each light channel, and detected by a light detector in each light channel; and a process of calculating the target distance according to the return delay time of the light pulse signal includes:

recording a return delay time Δt of the light pulse signal; and calculating the target distance through $$R = \frac{c \times \Delta t}{2},$$

where c is a speed of light.

The multi-channel LIDAR and ranging method solutions based on the light routing device described in this text have at least the following advantages:

First, the quantity of detection points per second per beam can be increased to N times, where N is a quantity of channels of the light routing device.

Figure 9:
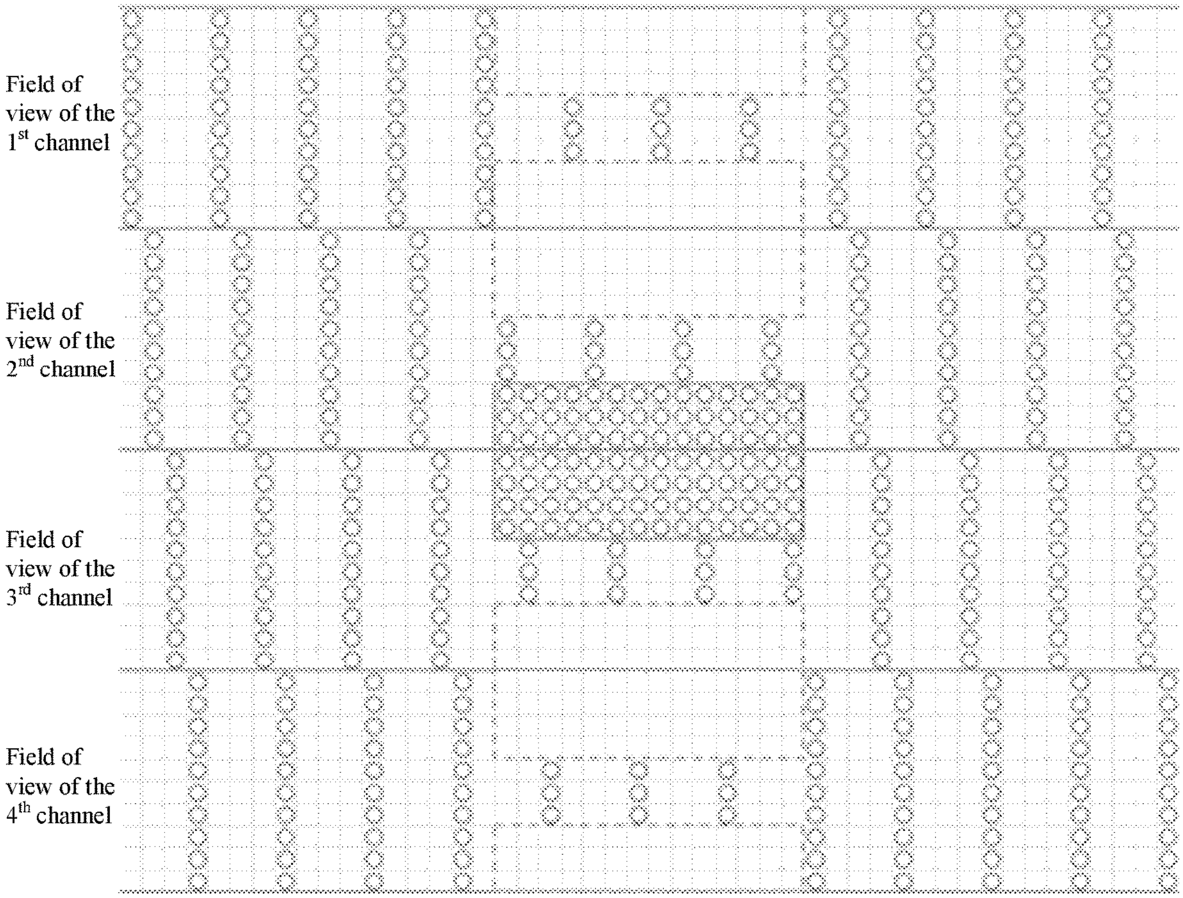
FIG. 9 is a scanning example diagram of a high-resolution region of interest based on light routing device control of the present invention.

Then, the scanning mode and angular resolution can be dynamically controlled according to needs. As shown in FIG. 9, the circles represent transmit points, the solid wireframe is a region of interest, and the dotted wireframes include transmit points that are moved to the region of interest. When the region of interest is identified, the light routing device may route signals in all light channels to the region of interest, to increase the angular resolution of the region of interest to N times (N=4 in this example); and in this case, some related regions in other light channels (the dotted wireframes in FIG. 9) may be sacrificed. It should be noted that the crosstalk between adjacent points is caused by overlapping of reflected signals from adjacent points in time domain, which is caused by a relatively large distance difference between targets of the adjacent points. The crosstalk on the target object in the region of interest is not obvious, because a deviation range of the adjacent points on a same object is relatively small.

The foregoing descriptions are merely specific implementations of the present invention, but are not intended to limit the scope of protection of the present invention. Any variation or replacement readily figured out by a person skilled in the art within the technical scope disclosed in the present invention shall fall within the scope of protection of the present invention. Therefore, the scope of protection of the present invention shall be subject to the protection scope of the claims.

The invention claimed is:

1. A LIDAR ranging method, comprising: circularly allocating, by a light routing device, each periodic signal of a transmit signal to each light channel in a chronological order, so that the light routing device does not need to wait for a previous signal to return before sending a next signal;

monitoring a beat signal or a returned light pulse signal in each light channel; and calculating a target distance according to a frequency of the beat signal or a return delay time of the light pulse signal, wherein circularly allocating comprises guiding each periodic signal to each light channel in arrangement order of the light channels, wherein the light routing device is set between a laser source and all light channels, the LIDAR ranging method further comprising circularly allocating at least one periodic signal of the transmit signal to each light channel in a chronological order via the light routing device before a reflected signal from a farthest target object within a maximum-ranging range is received in any light channel, wherein a single light detector needs to be equipped in each light channel.

2. The LIDAR ranging method according to claim 1, wherein a frequency of the transmit signal changes with time, part of the transmit signal is partitioned as a local oscillator signal, and the local oscillator signal is combined with the reflected signal in each light channel to form the beat signal.

3. The LIDAR ranging method according to claim 2, wherein a process of calculating the target distance according to the frequency of the beat signal comprises:

calculating a delay time tn of the beat signal $f_{IF}n$ detected at an nth chirp period relative to a start point of the nth chirp period through $$t_n = \frac{T \times f_{IF} n}{B},$$

wherein T is a chirp period duration and B is a bandwidth;

calculating a total delay time Δt of the beat signal $f_{IF}n$ detected at the nth chirp period relative to a start point of the transmit signal through $\Delta t = T_1 + T_2 + \ldots + T_{n-1} + t_n$, wherein T is an nth chirp period duration; and calculating the target distance through $$R = \frac{c \times \Delta t}{2},$$

wherein c is a speed of light.

4. The LIDAR ranging method according to claim 1, wherein the transmit signal is a light pulse signal, and the transmit signal in each light channel is reflected by a target object, returned to each light channel, and detected by a light detect or in each light channel; and a process of calculating the target distance according to the return delay time of the light pulse signal comprises:

recording are turn delay time Δt of the light pulse signal; and calculating the target distance through $$R = \frac{c \times \Delta t}{2},$$

wherein c is a speed of light.

* * * * *